United States Patent
Stapleton

[11] Patent Number: 5,129,419
[45] Date of Patent: Jul. 14, 1992

[54] PRESSURE CONTROL VALVE

[75] Inventor: Stephen J. Stapleton, Upland, Calif.

[73] Assignee: PneuDraulics, Inc., Rancho Cucamonga, Calif.

[21] Appl. No.: 612,229

[22] Filed: Nov. 13, 1990

[51] Int. Cl.⁵ .............................................. F16K 15/06
[52] U.S. Cl. ........................... 137/514.3; 137/543.15
[58] Field of Search ............ 137/508, 514.3, 514, 137/543.15, 514.5; 251/172

[56] References Cited

U.S. PATENT DOCUMENTS

| | | | |
|---|---|---|---|
| 2,593,522 | 4/1952 | Barnes | 137/514.5 X |
| 2,809,660 | 10/1957 | Becker | 137/514.3 |
| 2,970,802 | 2/1961 | Guerrero et al. | 251/172 |
| 3,027,913 | 4/1962 | Chatham et al. | 137/514.5 X |
| 3,850,405 | 11/1974 | White | 137/543.15 X |
| 4,018,248 | 4/1977 | Carr | 137/514.3 |
| 4,392,633 | 7/1983 | Van Winkle | 251/172 X |
| 4,469,125 | 9/1984 | Keeney | 251/72 X |
| 4,489,752 | 12/1984 | Deminski | 137/514.3 X |

Primary Examiner—Stephen M. Hepperle
Attorney, Agent, or Firm—Boniard I. Brown

[57] ABSTRACT

A valve having a valve poppet which is positioned by the opposing forces of a spring and inlet fluid pressure, and a dashpot located out of the path of fluid flow through the valve for damping movement of the poppet during rapid changes in fluid pressure without obstructing flow through the valve. The disclosed valve is a hydraulic pressure relief valve having a valve seat which is movable to aid alignment of the poppet and seat.

7 Claims, 1 Drawing Sheet

PRESSURE CONTROL VALVE

BACKGROUND AND SUMMARY OF THE INVENTION

1. Field of the Invention

This invention relates generally to fluid pressure control valves and more particularly to improvements in valves of the class having a valve member which is positioned by the opposing forces of a spring and fluid pressure.

2. Discussion of the Prior Art

This invention is primarily concerned with pressure relief valves for hydraulic systems, especially relief valves of the kind disclosed in prior U.S. Pat. No. 2,917,072, and will be described in the context of such valves. It will become evident as the description proceeds, however, that the improvements of the invention may be used to advantage in other valves of the class described.

Relief valves in general are very old in the art and widely used to limit maximum fluid pressure in fluid handling systems and the like. A typical relief valve has a body containing a fluid inlet, a fluid outlet, a fluid passage communicating the inlet and outlet, and a valve member or poppet which is spring biased toward a valve seat against the fluid pressure at the valve inlet. In use, the valve inlet is connected to a fluid pressure system, such as a hydraulic system, whose fluid pressure is to be limited, and the valve outlet is connected to a low pressure fluid receiver, such as hydraulic fluid reservoir. The poppet spring retains the poppet in a closed position wherein the poppet contacts the valve seat to block fluid flow through the valve so long as the inlet pressure remains below a certain pressure level. If the inlet pressure exceeds this pressure level, the poppet opens against spring force to vent fluid from the system.

The prior art is replete with a vast assortment of such relief valves. Prior U.S. Pat. No. 2,917,072, mentioned above, is concerned with reducing the spread between the cracking pressure and the full opening pressure of a relief valve, that is the spread between inlet pressure at which the valve cracks open just slightly and the inlet pressure at which the valve opens fully. The valve seat of this valve is movable to permit alignment of the seat and poppet and is spring biased toward the poppet. The poppet and valve seat springs normally yieldably retain the poppet and seat in closed positions wherein the poppet engages the seat to block fluid flow through the valve. In these closed positions, the seat has an unbalanced area exposed to fluid pressure at the valve inlet, whereby the seat is urged toward the poppet by both spring force and inlet fluid pressure.

Below a certain inlet fluid pressure level, referred to herein as a threshold pressure level, the poppet and valve seat are yieldably retained by their springs in certain normal closed positions wherein the poppet and seat occupy certain normal positions relative to the valve body and contact one another to block fluid flow through the valve. Increasing inlet pressure above this threshold pressure level moves the seat and poppet as a unit from such normal positions in the flow direction through the valve while the poppet and seat remain in mutual seating contact to block flow through the valve. This movement of the poppet and valve seat as a unit by increasing inlet pressure while blocking fluid flow through the valve continues until the seat engages a limit stop on the valve body at some elevated inlet pressure level higher than the threshold pressure level. Any further increase in inlet pressure then moves the poppet out of engagement with the seat to first crack the valve open and then immediately open the valve fully in such a way that the spread between the initial cracking pressure of the valve and its full opening pressure is relatively small. Fluid flow through the open valve occurs from the inlet, which is located at one end of the valve body, to an outlet at the opposite end of the body.

Operation of the prior relief valve is enhanced by its incorporation of a dashpot for damping movement of the valve poppet. This dashpot comprises a post which is attached at one end to the valve body and has at its other end a piston which slides with a narrow clearance within a cylinder-forming recess or bore in the poppet. Movement of the poppet in the valve body results in relative movement of the piston in the cylinder to damp such poppet movement and thereby prevent unstable operation of the relief valve during periods of rapid fluctuations in the valve inlet pressure.

This prior valve has an inlet chamber upstream of the valve poppet and seat, and the dashpot post is attached to a spider-like support which spans this inlet chamber. The post extends from the spider through the inlet chamber and a central opening in the valve seat to the cylinder in the poppet. Incoming fluid flow occurs through openings in the supporting spider, then through the annular flow spaces about the dashpot post, and finally through generally longitudinal flow passages in the valve poppet to the valve outlet.

This valve arrangement is quite satisfactory for many applications but has certain disadvantages in other applications, notably those which require a relatively small overall valve size. This disadvantage resides in the fact that the dashpot (i.e., the dashpot post) is located in the path of fluid flow through the valve and thus obstructs fluid flow through the valve. The flow openings or passages in the post supporting spider and in the valve member further restrict flow through the valve. Accordingly, the prior valve arrangement restricts the flow capacity of the prior valve when fully open. In a relatively large size valve, of course, the flow passages can be made sufficiently large to provide a desired flow capacity. The valve size can be reduced only so much, however, without causing unacceptable flow restriction.

SUMMARY OF THE INVENTION

This invention provides a valve embodying an improved valve poppet damping arrangement which prevents unstable valve operation during periods of rapid fluctuations in fluid pressure and avoids the above noted disadvantages of the damped poppet in the prior valve. To this end, the improved valve of the invention has a valve poppet, a valve seat located between one side of the poppet and the valve inlet and engageable by the poppet to block fluid flow from the inlet to the valve outlet, and poppet damping means located at the opposite side of the poppet and hence outside of the fluid flow path between the inlet and outlet so as to not obstruct fluid flow through the valve. This valve improvement permits a substantial reduction in the overall size of the valve for any given valve flow capacity and, conversely, a substantial increase in flow capacity for any given overall valve size.

The improved valve of the invention is intended primarily for use as a hydraulic relief valve. As mentioned earlier and will become evident as the description proceeds, however, the improvements of the invention may be utilized to advantage in other types of valves.

DESCRIPTION OF THE PREFERRED EMBODIMENT

Figure 6:
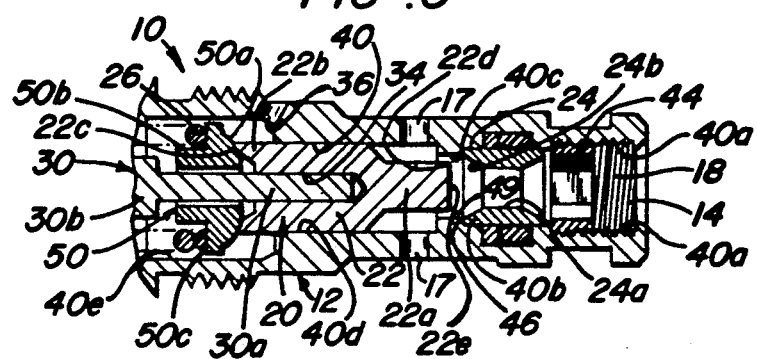
FIG. 6 is a fragmentary longitudinal section through the valve in its fully open condition.

Turning now to these drawings, the illustrated relief valve 10 has a valve body 12 containing a port 14 forming a fluid inlet, a plurality of ports 17 collectively forming a fluid outlet 16, and a fluid passage 18 communicating the inlet and outlet. Within the valve body 12 are valve means 20 including a valve member or poppet 22 which is urged by fluid pressure at the inlet 14 in the direction of fluid flow through the valve and toward a fully open position shown in FIG. 6. In this open position, the valve means 20 permits flow through the valve from the inlet 14 to the outlet 16. The poppet 22 is movable in a direction opposite to the flow direction through the valve and against inlet fluid pressure to the closed position shown in FIG. 2. In this closed position, the right hand end of the poppet 22 in FIG. 2, referred to herein as its front end, engages a valve seat 24 to block fluid flow through the valve from the inlet 14 to the outlet 16. A spring 26 urges the poppet 22 toward this closed position.

In use of the valve 10, the valve inlet 14 is connected to a fluid pressure system (not shown) whose fluid pressure is to be limited to a certain maximum pressure level. The valve outlet 16 is connected to a low pressure fluid receiver which may be a low pressure fluid reservoir. The valve spring 26 is sized to retain the poppet 22 in its closed position of FIG. 2 as long as the fluid pressure at the valve inlet 14 remains below a certain pressure level referred to herein as a threshold pressure level. An increase in inlet fluid pressure above this threshold pressure level urges the poppet 22 out of contact with the seat 24 against the thrust of the valve spring 26 to open the valve to fluid flow from the inlet 14 to the outlet 16.

According to this invention, the valve 10 is provided with damping means 28 located outside the path of fluid flow from the inlet 14 to the outlet 16 for damping movement of the poppet 22 and thereby minimizing or eliminating instability of the valve during rapid or abrupt changes in inlet fluid pressure. Being outside the fluid flow path, the damping means 28 does not obstruct fluid flow through the valve and as a consequence permits a reduction of the overall valve size for any given valve flow capacity and, conversely, an increase in flow capacity for any given valve size.

The preferred damping means 28 shown constitutes a dashpot. This dashpot comprises a post 30 located within the valve body 12 at the rear end (left end in the drawings) of the poppet 22. The post extends along the axis of the poppet 22 and is fixed at its left end in the drawings to the valve body 12 in the manner described below. The right end of the post is reduced in diameter to form a dashpot piston 30a which fits within a coaxial recess or bore 34 entering the rear end of the poppet 22. This recess or bore forms a dashpot cylinder which is sized in diameter relative to the diameter of the piston 30a to provide a dashpot damping action on the poppet during its movement by the opposing fluid and spring forces acting on the poppet. The particular dashpot shown utilizes fluid as the damping fluid, and for this reason the interior of the valve housing 12 at the rear of the poppet 22 is vented to the low pressure fluid reservoir through a passage 36 in the valve housing.

Referring now in more detail to the drawings, the body 12 of the preferred relief valve 10 illustrated is a generally tubular body including a generally tubular portion 38 containing a stepped axial bore 40. From right to left in the drawings, the bore 40 has an internally threaded right end 40a which opens through the right end of the body to form the valve inlet 14, an adjacent smaller diameter portion 40b containing the valve seat 24, a following still smaller diameter portion 40c, a following larger diameter portion 40d containing the poppet 22, a following still larger diameter portion 40e, and a relatively large diameter, internally threaded left end portion 40f which opens through the left end of the body portion 40. Threaded in this large left end portion 40f of the body bore 40 and sealed to the surrounding wall of the valve body 12 (i.e., wall of the valve body portion 38) is an end cap 42 which closes the left end of the tubular body portion 38.

The valve seat 24 of the illustrated relief valve 10 is a movable seat in the form of a sleeve which can move or float in the valve body 12 to permit alignment of the seat and poppet 22. This floating seat is sealed to the surrounding wall of the valve body 12. Threaded in the internally threaded right end portion 40a of the body bore 40 is an annular nut 44 which is engageable by the valve seat 24 to limit movement of the seat in the upstream direction of flow through the valve and to its upstream limiting position shown in FIG. 2. The juncture of the portions 40b, 40c of the body bore 40 forms a limit stop shoulder 46 engageable by the seat 24 to limit movement of the member in the downstream direction of flow through the valve and to its downstream limiting position shown in FIG. 6.

The poppet 22 has front and rear ends 22a, 22b, respectively. The rear poppet end 22b is slidable in the portion 40d of the valve body bore 40. The front poppet end 22a has a smaller diameter than both the rear poppet end 22b and the portion 40c of the body bore 40. When the valve 10 occupies its closed condition of FIG. 2, the front poppet end 22a extends through the body bore portions 40c, 40d to form an annular flow space 49 between the latter poppet end and the surrounding wall of the valve body 12. The poppet 22 has a concave rear end face 22c through which the coaxial dashpot recess or cylinder 34 opens to receive the dashpot piston 30a. The outlet ports 17 are spaced about the valve body and open to the annular flow space 49.

The dashpot post 30 has a rear portion 30b at the rear end of which is a radial flange 30c. This flange fits closely within a coaxial recess in the adjacent front side of the body end cap 42. Slidable on the dashpot piston 30a is a spring seat 50 having a front convex face 50a and rear cylindrical stem 50b. The front spring seat face 50a engages the rear concave face 22c of the poppet 22. The ends of the poppet bias spring 26 surround the rear cylindrical portion 30b of the post 30 and the rear cylindrical stem 50b of the spring seat 50 and engage the post flange 30c and a shoulder 50c on the spring seat 50. The spring 26 urges the post flange 30 rearwardly against the valve body end cap 42. As explained below, the spring 26 urges the spring seat 50 forwardly against the poppet 22 to normally yieldably retain the poppet 22 and seat 24 in their normal closed positions of FIG. 2 to block flow through the valve from the inlet 14 to the outlet 16.

The valve seat 24 contains an axial opening or passage 24a whose diameter is somewhat smaller than that of the front end 22a of the poppet 22. The rear end of the seat is internally beveled to form about the rear end of the passage 24a a conical valve seat 24b. The radially outer and inner diameters of this seat are larger and smaller, respectively, than the diameter of the front end 22a of the poppet 22. The front annular edge 22d of the poppet 22 is engageable in fluid sealing relation with the valve seat 24b between the radially inner and outer annular edges of the seat when the valve and seats occupy their engaged positions of FIG. 2. When thus engaged, the poppet edge 22d and valve seat 24b form a fluid seal about the rear end of the seat passage 24a which blocks fluid flow through the valve from its inlet 14 to its outlet 16. Accordingly, the valve edge 22d and the valve seat 24b constitute coacting seal means on the poppet 22 and seat 24 which are mutually engageable in fluid sealing relation to form between the members a seal which closes the valve.

The operation of the relief valve 10 will now be explained. The valve body 12 is externally threaded at 60 for threaded engagement is an internally threaded opening 62 in a manifold (not shown) which has an inlet passage communicating the valve inlet 14 and an outlet passage communicating the valve outlet ports 17 and a low pressure fluid receiver, such as a reservoir (not shown). Appropriate sealing is provided between the valve body and the manifold between these passages and between the outlet passage and the open end of the manifold. The inlet passage connects to a fluid handling system (not shown) whose fluid pressure is to be limited to a certain maximum pressure level. The fluid pressure then existing at the valve inlet acts directly and rearwardly on both the poppet 22 and valve seat 24—that is, in the direction of fluid flow through the valve, in opposition to the thrust of the poppet spring 26. In this regard, it will be seen that only the front end face 22e of the poppet 22 is exposed to the inlet pressure through the central opening or passage 24a in the seat, whereby inlet pressure acts only rearwardly on the poppet. In contrast, inlet pressure acts both rearwardly on the entire annular cross-section of the seat 24 and forwardly—that is, in a direction opposite to the flow direction through the valve, on the smaller partial annular cross-section of the seat between the seating edge 22d of the poppet and the radially inner edge of the valve seat 24b. Accordingly, as long as the poppet 22 and seat 24 remain engaged with their seal means, i.e., valve edge 22d and valve seat 24b, in fluid sealing contact with one another, the seat has a net unbalanced cross-sectional area on which inlet pressure acts rearwardly on the seat.

Figure 1:
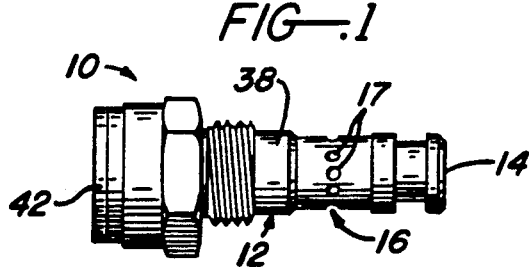
FIG. 1 illustrates an improved relief valve according to the invention.
Figure 2:
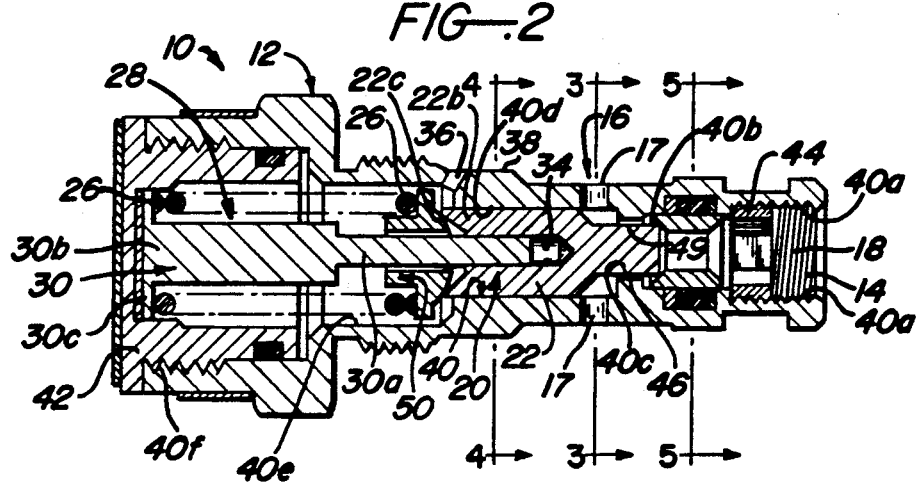
FIG. 2 is an enlarged longitudinal section through the valve in its normal fully closed condition.
Figure 3:
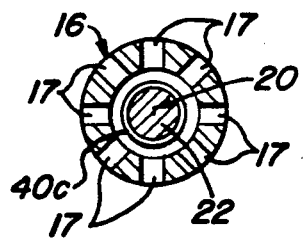
FIG. 3 is a section taken on line 3—3 in FIG. 2.
Figure 4:
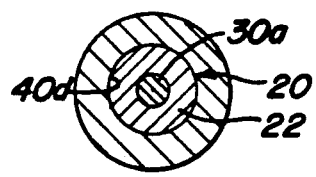
FIG. 4 is a section taken on line 4—4 in FIG. 2.
Figure 5:
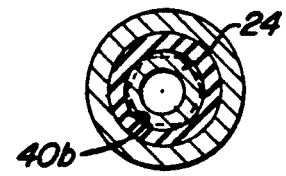
FIG. 5 is a section taken on line 5—5 in FIG. 2.

The poppet spring 26 is sized to retain the poppet 22 and seat 24 in their closed positions of FIG. 2 as long as the inlet pressure remains below a threshold pressure level determined by the constant of the valve spring 26. In these closed positions, the front end 22a of the poppet 22 extends through the portion 40c of the body bore 40, and its front seating edge 22d is urged forwardly into fluid sealing contact with the valve seat 24b about the rear end of the passage 24a in the seat 24. The seat is urged forwardly against its front limit stop 44. The valve is then closed.

Increasing inlet pressure above this threshold pressure level results in rearward movement of the engaged poppet 22 and seat 24 in unison while their seal means 22d, 24b remain in fluid sealing contact to continue blocking flow through the valve until the seat engages its front limit stop 46 at an elevated pressure level slightly above the threshold pressure level. Further increasing inlet pressure above this elevated pressure level initially cracks the seal between the poppet 22 and seat 24 by slightly separating their seal means 22d, 24b to permit fluid flow between the separated seal means and through the annular flow space 49 about the front end 22a of the poppet to the valve outlet 16. Fluid pressure then acts on the full cross-section of the poppet and immediately moves the poppet to its full open position of FIG. 6. The poppet spring 26 returns the poppet and seat toward their closed positions in response to the drop in inlet pressure caused by such venting of fluid from the fluid handling system.

The damping means or dashpot 28 acts to produce a viscous damping force on the poppet 22 which resists rapid movement of the poppet. This damping action prevents unstable operation of the valve in response to rapid fluctuations in inlet pressure. Being located at the rear of the poppet 22, the dashpot is located out of the path of and hence does not obstruct fluid flow through the valve. As noted earlier, this permits the flow capacity of a valve of given overall size to be minimized and, conversely, the overall size of a valve of given flow capacity to be minimized.

Thus there has been shown and described a novel pressure control valve which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. In a valve, the combination comprising:

a valve body having a fluid inlet, a fluid outlet, and a fluid passage communicating said inlet and said outlet for fluid flow through said passage in a direction from said inlet to said outlet, valve means in said passage including a valve poppet movable longitudinally of said passage, a valve seat located between said poppet and said inlet and movable longitudinally of said passage, first limit means for positively limiting movement of said seat in said flow direction to a fixed downstream limiting position relative to said body, second limit means for positively limiting movement of said seat in the opposite direction to an upstream limiting position relative to said body, coacting seal means on said poppet and seat which are engageable in fluid sealing relation with one another by relative movement of said poppet and seat toward one another to engaged positions to form between said poppet and seat a seal that blocks fluid flow through said passage and which seal means are separable by relative movement of said poppet and seat away from one another to disengaged positions to permit fluid flow through said passage, and spring means urging said poppet toward said seat for normally yieldably retaining said poppet and seat in closed positions wherein said seat occupies its upstream limiting position with said poppet and seat mutually engaged in fluid sealing relation, damping means located outside the path of fluid flow through the valve of damping movement of said poppet, and wherein said seat has an unbalanced cross-sectional area which is exposed to inlet pressure when said poppet and seat are mutually engaged in fluid sealing relation, whereby when fluid under pressure is supplied to said valve inlet (a) said spring means retains said poppet and seat in said closed positions to maintain said valve closed as long as the inlet pressure remains below a given threshold pressure level, (b) an increase in inlet pressure above said threshold pressure level moves said poppet and seat as a unit in their engaged positions in said flow direction against the thrust of said spring means to maintain said valve closed until said seat reaches its downstream limiting position at a certain elevated inlet pressure level greater than said threshold pressure level, and (c) an increase in inlet pressure above said elevated pressure level moves said poppet in said flow direction relative to said seat against the thrust of said spring means to first crack said seal and then immediately fully open said valve.

2. A valve combination according to claim 1, wherein: said damping means comprises dashpot means.

3. A valve combination according to claim 1, wherein:
said poppet and seat have adjacent ends,
said seal means are located at said adjacent ends, and
said damping means comprises dashpot means operative between said body and the opposite end of said poppet.

4. A valve combination according to claim 2, wherein: said dashpot means comprises a piston and cylinder.

5. In a valve, the combination comprising:
a valve body having a longitudinal bore, a wall circumferentially surrounding said bore, a first fluid port opening through said body to one end of said bore, and a second fluid port opening through said wall to said bore between said first port and the opposite end of the bore for fluid flow between said ports through said bore,
valve means in said body comprising a valve poppet slidable in said bore having one end disposed in sliding contact with said wall between said second port and said opposite end of said bore and movable longitudinally of said bore, a valve seat about said first port, coacting seal means on the opposite end of said poppet and said seat which are mutually engageable by relative movement of said poppet toward said seat to form between the poppet and seat a seal that blocks fluid flow between said ports and which seal means are separable by relative movement of said poppet away from said seat to permit fluid flow between said ports, and spring means urging said poppet toward said seat for normally yieldably retaining said poppet and seat in closed positions wherein they are mutually engaged in fluid sealing relation, damping means acting between said one end of said poppet and said body at said opposite end of said bore for damping movement of said poppet, and wherein said first fluid port is a fluid inlet, said second fluid port is a fluid outlet, said seat has positively limited movement between limiting positions toward and away from said poppet and an unbalanced cross-sectional area which is exposed to inlet fluid pressure when said poppet and seat are mutually engaged in fluid sealing relation, whereby when fluid under pressure is supplied to said valve inlet (a) said spring means retains said poppet and seat in their closed positions to maintain said valve closed as long as the inlet pressure remains below a given threshold pressure level, (b) an increase in inlet pressure above said threshold pressure level moves said poppet and seat as a unit in their closed positions against the thrust of said spring means to maintain said valve closed until said seat reaches its corresponding limiting position at a certain elevated pressure level greater than said threshold pressure level, and (c) an increase in inlet pressure above said elevated pressure level moves said poppet relative to said seat against the thrust of said spring means to first crack said seal and then fully open said valve.

6. In a valve, the combination comprising:
a valve body having a longitudinal bore, a wall circumferentially surrounding said bore, a first fluid port opening through said body to one end of said bore, and a second fluid port opening through said wall to said bore between said first port and the opposite end of the bore for fluid flow between said ports through said bore,
valve means in said body comprising a valve poppet slidable in said bore having one end disposed in sliding contact with said wall between said second port and said opposite end of said bore and movable longitudinally of said bore, a valve seat about said first port, coacting seal means on the opposite end of said poppet and said seat which are mutually engageable by relative movement of said poppet toward said seat to form between the poppet and seat a seal that blocks fluid flow between said ports and which seal means are separable by relative movement of said poppet away from said seat to permit fluid flow between said ports, and spring means urging said poppet toward said seat for normally yieldably retaining said poppet and seat in closed positions wherein they are mutually engaged in fluid sealing relation, and
dashpot means acting between said one end of said poppet and said body at said opposite end of said bore for damping movement of said poppet comprising a piston on said body engaging in a cylinder in said one end of said poppet.

7. A valve combination according to claim 6, wherein:
said piston has a first end within said cylinder, a second end seating against said body, and a flange about said second piston end, and
said spring means comprises a spring acting between said flange and said poppet.

* * * * *